United States Patent Office 3,234,003
Patented Feb. 8, 1966

3,234,003
CONDITIONING AGENT AND HYGROSCOPIC PARTICLES CONDITIONED THEREWITH
Edgar W. Sawyer, Jr., Metuchen, and Homer A. Smith and Robert W. Wert, Berkeley Heights, N.J., assignors to Minerals & Chemicals Philipp Corporation, Menlo Park, N.J., a corporation of Maryland
No Drawing. Filed Mar. 28, 1962, Ser. No. 183,041
8 Claims. (Cl. 71—27)

This invention relates to conditioning particles of hygroscopic material which normally tend to coalesce and cake during storage due to the effects of moisture, temperature and/or pressure and relates especially to a novel composition which, when applied to hygroscopic particles, especially fertilizer particles, prevents their coalescence and caking during storage.

The caking of fertilizer and other hygroscopic salts during storage presents serious difficulties to the producer and ultimate user. Fertilizer materials which cake are not amenable to usual bulk storing and handling techniques and after storage cannot be spread with mechanical distribution devices. To prevent or minimize caking of hygroscopic salts, a variety of methods has been suggested and put into practice. One of the most noteworthy has been the production of fertilizer salts in the form of regularly sized granules or prills rather than in powdered form in which there would be more sites for intercrystalline growth with resultant caking of the salt particles. While granules are generally less prone to cake than powders of the same composition, there are many types of fertilizer granules and prills, especially those high in watersoluble nitrogen, which form hard cakes when stored in moist environments. Several methods have met with success in preventing caking of a limited group of granular salts. Thus, for example, a limited group of fertilizer salts can be effectively conditioned by coating individual particles of the salt with about 2% to 5% of powdered absorptive solids such as diatomaceous earth, various clays or limestone. These conditioning agents can occasionally be used with some success in conditioning high nitrogen analysis fertilizer granules, such as ammonium nitrate prills and 10–10–10 mixed fertilizer granules, provided the granules have previously been dried to an exceptionally low moisture content, e.g., a moisture content of say 0.1% to 0.5%. Drying fertilizer salts to a moisture content less than about 1% adversely affects the manufacturing cost of the fertilizer. Consequently, the cost involved in conditioning high nitrogen fertilizer salts with powdered sorbents is not practical. Moreover, the results frequently leave much to be desired.

One of the most promising methods for conditioning high nitrogen content fertilizer salts, especially salts which are somewhat moist, is fundamentally different in concept from the use of particulate solid sorbents. This method involves coating granules of the fertilizer salt with an extremely small quantity, e.g., ½ to 2 lbs./ton, of a hydrophobic fatty amine.

The fatty amines appear to prevent caking by providing on the surface of the fertilizer granule a hydrophobic layer which curtails absorption of water by the granule. To accomplish this, it is believed that the fatty amine should be added to the granule in amount sufficient to provide an impervious layer thereon so that the amine group will attach itself directly to the granule, leaving the hydrophobic fatty group of the amine oriented outwardly. Upon addition of amine in excess of that required to provide a monolayer, the fatty group of the additional amine is thought to become attached to the outwardly oriented fatty group of the first layer, leaving a polar amine group projecting outwardly. Fertilizer granules containing on their surface all or a major portion of exposed polar amine groups would not be expected to be as water repellant as a granule with exposed fatty groups. Moreover, exposed amine groups would be potentially reactive with any phosphates in the fertilizer to form an insoluble amine phosphate. Therefore, the presence of excess amine at any site of the surface of fertilizer granule would be expected to be as deleterious as the absence of amine at another site. From these considerations it would appear that the effectiveness of amine anticaking agents will depend upon applying the amine as a very uniform coating on the surface of salt particles and upon the use of the amine in amount to form a monolayer. These beliefs are substantiated by actual practice and it has been found that the amine must be provided as an extremely uniform coating on the granule in order to be effective even when the amine is employed at a desirable level.

To provide uniform distribution of the extremely small quantity of fatty amine conditioning agent on granules or prills of a soluble fertilizer salt, a heat liquified amine or a solution of amine in organic solvent is sprayed onto agitated fertilizer granules. Usually the granules are heated before addition of amine to facilitate coating. Since the fatty amines have very limited water solubility, the cost of drying granules coated with an aqueous solution of amine would be prohibitive. In commercial operations it is extremely difficult to insure the uniform distribution of the small quantity of amine on the fertilizer granule and promising laboratory results have not been translated into successful commercial scale operations because of the inability to provide a sufficiently uniform amine coating on the surface of the salt particles with commercial spraying devices and material handling equipment.

Accordingly, a principal object of this invention is the provision of an improved coating agent for conditioning particles of fertilzier salts, especially high nitrogen analysis fertilizer salts, which avoids difficulties inherent in the use of prior art conditioning agents.

A more particular object of this invention is the provision of improved means and methods for uniformly applying a hydrophobic amine conditioning agent to fertilizer granules which are amenable to conditioning with said amine.

A more specific object of this invention is the provision of a novel clay product which is extremely effective when coated on particles of hygroscopic salts in preventing or curtailing caking of such particles.

A further object of this invention is the provision of a clay product of the type mentioned above which has extremely good adhesion to fertilizer salt particles.

Another object is an improved method for conditioning hygroscopic salts which obviates the need for spraying devices.

Still another object is the provision of improved cake-resistant salt compositions.

Further objects and advantages will be readily apparent.

The subject invention, in essence, constitutes an improved technique for conditioning hygroscopic particles against caking with hydrophobic amines. This invention results from the discovery that the effectiveness of hydrophobic amines as anticaking agents for hygroscopic particles can be markedly improved by utilizing the unique properties of a particular clay material, hereafter described, in conjunction with the use of an oily solvent material, to apply the hydrophobic amine conditioning agent to particles of hygroscopic material.

Stated briefly, in accordance with the subject invention, an improved conditioning agent in the form of a free-flowing powder is obtained by coating microscopic particles of kaolin clay with a small amount of a solution of a hydrophobic aliphatic amine in an oleaginous solvent for the amine, said amine being a primary n-aliphatic monoamine containing from 8 to 22 (and preferably 12 to 18) carbon atoms.

The coated clay product is dusted on the surface of hygroscopic granules or prills, especially particles of fertilizer salts high in available nitrogen, and adheres tenaciously thereto. The resultant coated granules resist caking when subjected during storage to conditions of moisture and/or pressure which would normally cause the hygroscopic particles to set up into hard cakes or so-called "tombstones." While certain coated granules may form lumps when subjected to pressure and/or high humidity conditions for prolonged times, normally such lumps are friable and can be broken up merely by dropping a bag containing the material to the ground from a height of a few feet. This physical condition is considered to be satisfactory by most fertilizer users. The coated clay composition of this invention has been found to prevent caking of materials such as ammonium nitrate prills when the particles are subjected to storage conditions under which most prior art conditions are of little or no benefit in preventing caking.

It has been found, moreover, that when an oily solution of fatty amine is precoated on kaolin clay, in accordance with this invention, that the resultant composition is generally considerably more effective in curtailing caking of hygroscopic granules than the same quantity of oily amine solution applied directly to the surface of the granules by spraying. In fact, in most cases the precoated clay will be more effective than oily amine solution sprayed directly onto surface of granules in amount substantially greater than the solution employed in precoating the clay. It has been found, for example, that granules of mixed 14-0-14 fertilizer prills remained free flowing and substantially free from surface set when conditioned with only 1 lb./ton of an oily solution of mixed fatty amines which had been precoated on kaolin clay. However, caking and marked surface set occurred when the granules were sprayed with as much as 2 lbs./ton of the same amine solution. Similar results were obtained in conditioning ammonium nitrate prills. Thus, the presence of the kaolin clay with the amine and oil gives results not obtainable without the use of the clay. Moreover, extensive tests carried out with minerals other than kaolin clay and with kaolin clay and fatty amine without oil indicate that the beneficial results mentioned above depend on both the selection of kaolin clay as the mineral and the use of oil with the kaolin clay and suitable amine. The following would appear to offer a logical explanation for these phenomena.

The clay ingredient of the conditioning composition of this invention is a material which possesses some, but very limited, sorptive capacity. This material is believed to serve principally as an agent to transfer an active conditioning chemical, namely, an oil solution of a hydrophobic amine, to the surface of particles of hygroscopic salt material. Thus, it appears that when the clay composition is applied to fertilizer granules, the amine solution originally present on the minute clay crystals migrates during storage onto the surfaces of the fertilizer granule in response to the action of any one or a combination of the following factors: mechanical pressure, heat and moisture. The clay crystals are extremely small as compared with granules of fertilizer salts and the clay crystals provide a strikingly larger exposed surface on a weight basis than do the larger fertilizer granules. Gradual release and transfer of amine solution from a multiplicity of sites on a plurality of individual microscopic clay crystals surrounding the fertilizer granules would appear to permit a more uniform distribution of the solution on the surface of fertilizer granules than could be effected by spraying the amine solution directly onto the granules with commercial spraying devices. This would account for the fact that smaller quantities of amine can be employed when the amine has been precoated on the clay in accordance with this invention. Obviously, if the kaolin functions as a carrier or transfer agent for the amine conditioning agent, the bond between the conditioning agent and kaolin must be, for the most part, an impermanent one. The affinity of the amine for the surface of the salt granule, especially a moist granule, must exceed the affinity of the amine for the clay. That transfer of amine solution from the clay to the salt particles does occur when fertilizer salts are conditioned, in accordance with this invention, is evidenced by the fact that minerals, such as fuller's earth, sub-bentonites and talc, which have considerably better absorptive properties than kaolin clay and, therefore, have a greater affinity for the oily amine solution than kaolin clay, are wholly ineffectual when substituted for the kaolin clay. That the oily amine solution is transferred from the kaolin clay to hygroscopic salt granules is further suggested by the fact that the coated clay composition of this invention possesses substantially the same surface active properties of the coating per se. In contrast, clays containing chemically reacted hydrophobic amine groups have surface active properties that are substantially different from those of the hydrophobic amine per se. Thus, it will be shown hereafter that coated clay compositions of this invention have a strong tendency to spread on the surface of a saturated ammonium nitrate solution while a variety of other organophilic clays do not possess this property. The apparent necessity for the use of oily solvent in conjunction with the amine may be explained by the role of the oil in maintaining the amine in liquified transferable condition and also in curtailing undesirable chemical or physical affixation of the amine to the clay, as by ion-exchange.

The kaolin clay, however, is not believed to function solely as a carrier for an active conditioning chemical. Experience indicates that after active conditioning chemical has been transferred from the clay to the fertilizer granules, the residual kaolin clay will still be hydrophobic and, therefore, contribute somewhat to prevent caking by providing a water-repellent barrier around the amine coated fertilizer granules.

From this brief description of the clay conditioning agent of this invention and its probable mode of operation, it will be readily apparent that the nature and function of the conditioning agent are completely unrelated to the nature and function of prior art conditioning agents consisting of inorganic adsorbent powder, such as fuller's earth, diatomaceous earth, bentonite or even kaolin. In fact, it will be shown hereafter that certain minerals which have met fairly widespread use as conditioners for hygroscopic salts in their naturally occurring state are completely ineffectual as conditioning agents when coated, in accordance with this invention, with an oily amine solution. It will also be readily apparent that the amine coated kaolin conditioning agent of this invention differs fundamentally in nature from onium reacted clay conditioning agents of the prior art, as described in U.S. 2,702,747 to Studebaker. The prior art onium clays are obtained by chemically reacting a clay having high base-exchange capacity, such as Wyoming bentonite, with a suitable amine to form a hydrophobic amine bentonite complex in which the amine cation is an integral part of the clay lattice (in contrast with the coated clay of this invention wherein the amine is only loosely held by the clay). High base-exchange capacity clays, such as certain bentonites and attapulgite (a type of fuller's earth) which are useful in forming onium clay conditioning agents are not useful in producing the coated clay product of this invention. Conversely, kaolin clay, the mineral used in carrying out this invention, has a very low base-exchange capacity and is not suitable for use in preparing the onium clay conditioning agent of the prior art. Moreover, it will be shown hereafter that onium clays are extremely poor conditioning agents as compared with the clay product of this invention and, further, that the adhesion of the onium clay to fertilizer granules is extremely poor as compared with the adhesion of clay products made in accordance with this invention. Likewise, the conditioning agent of this invention differs in principle and nature from other prior conditioning agents in the form of hydrophobic particulate matter, such as the wax or oil coated natural mineral dusts described in U.S. 2,523,420 to Burrage. The latter, like onium clays, merely provide a hydrophobic surface coating on hygroscopic particles to which they are applied. The hydrophobic materials employed in coating the mineral particles are not surface active and they do not wet and spread on the surface of salt particles being conditioned, as do the clay coating materials employed in carrying out this invention.

We are also aware that it has been suggested in U.S. 2,539,012 to Diamond to use any one of several types of inorganic filler particles coated with hydrophobic amines or other surfactants for conditioning sodium chloride. These particles are used in conjunction with magnesium stearate which is applied directly onto the surface of the salt particles. The filler particles merely perform their usual function, which is to improve the ease with which the salt particles flow. It is the magnesium stearate which is coated directly on the salt particles that functions to prevent caking of the salt particles. The amine or equivalent nonionic or anionic surfactant present on the filler particles serves merely as an ingredient to prevent the formation of a magnesium stearate scum by dispersing the stearate soap when the coated sodium chloride is dissolved in water. In other words, the only function of the surfactant is to disperse an insoluble soap that is employed as the active conditioning agent. No oily solvent is employed with the amine or other surfactant, and the amine or other surfactant is not transferred to the salt particles during storage.

In putting this invention into practice, the total quantity of oily amine solution applied to the clay does not exceed about 10% of the dry clay weight (determined by heating the clay to constant weight at about 220° F.). When the coating agent is used in greater amount, the free-flowing property of the clay is impaired and the coated material cannot be uniformly disseminated on the particles of fertilizer salts. The coating agent loses much of its effectiveness when used in amount less than about 1% of the clay weight. Preferred is the use of coating agent in amount within the range of about 2% to 8% of the clay weight, with the range of about 3% to 6% being especially preferred for economic reasons. The proportion of amine to oily solvent in the coating agent is usually within the range of 15 to 85 parts by weight of amine to 85 to 15 parts by weight of oily solvent, preferably from about 30 to 60 parts amine to about 70 to 40 parts oil. The oily solvent is preferably employed in amount sufficient to maintain the amine in liquid condition at ambient temperature (e.g., 70° F.). The optimum quantity of oil will vary with the amine and nature of the oily solvent.

It is also within the scope of this invention to incorporate an extremely small quantity of an oil-compatible non-cationic surface active agent into the oily amine coating solution before adding the solution to the clay for the purpose of improving the ease of coating the solution onto the clay. The use of such material is optional only and excellent results can be expected without employing the surfactant. When certain nonionic surfactants, such as condensation products of ethylene oxide with fatty acids, are employed, they also produce the desirable result of reducing the amount of fumes produced by the amines when they are coated on the clay. The nonionic surfactant or anionic surfactant is used in amount of about 0% to 15% of the weight of the amine. When used, this material is preferably employed in amount within the range of about 1% to 3% of the weight of the amine.

The term "kaolin clay" as used herein refers to a clayey material whose predominating mineral species is a platelike clay mineral of the approximate formula $$Al_2O_3.2SiO_2.2H_2O$$

The mineral species may be kaolinite, anauxite, dickite and nacrite, all of which are closely related mineralogically and characterized by the formula given above. Kaolinite is the most abundant of these minerals and is therefore preferred. Substantially pure kaolinite is preferred to impure forms of kaolin clay, although the presence of illitic impurities with the kaolinite should not be deleterious. However, the presence of appreciable quantities of highly absorptive minerals with the kaolinite should be avoided.

After preliminary crushing and removal of grit, the whole clay can be used in producing the clay composition of this invention. Whole clay after degritting usually has an average equivalent spherical diameter of about 1½ microns. The preferred clay is a coarse size fraction of degritted clay that is obtained by hydraulic or air classification. Such clay may have an average equivalent spherical diameter within the range of about 3 to 10 microns. A coarse size fraction of clay is less prone to dust than finer clay and, moreover, it is less expensive and has a lower oil absorption value on a weight basis than finer clay. Excellent results have been obtained with a commercial coarse size fraction of Georgia kaolin clay (ASP 400) which is substantially pure kaolinite and has an average equivalent spherical diameter of about 5 microns. A fine size fraction of the clay can also be used.

In producing the clay conditioning agent of this invention, dry clay can merely be dry blended at room temperature with a solution of amine in oil in a blending mill and the mixture pulverized. The preferred method is to drip the amine solution, heat liquified when necessary, onto the dry clay in a blending device, agitate the ingredients and mill the ingredients to obtain a product which is substantially (e.g., at least about 98% by weight) minus 325 mesh (44 microns). In practice, this may be done by metering the liquid amine solution into a screen mill into which clay is metered and blending the ingredients in the mill using a 0.027-inch screen, for example. It may be advantageous to heat the amine solution even when the solution is normally a liquid to decrease the viscosity of the solution and thereby facilitate spreading of the solution on the clay particles. It is also desirable to heat the clay before incorporation of the amine solution and the clay temperature should be somewhat higher than that of the solution applied thereto. Good results in uniformly coating the clay can be brought about using the technique described above without using spraying equipment.

The free moisture content of the coated clay should be from 0% to about 1% by weight.

Pure aliphatic amines of the formula $RNH_2$ (wherein R is an aliphatic radical containing 8 to 22 carbon atoms) can be used singly or in combination in carrying out this invention, and the aliphatic radical of the amines can be saturated or unsaturated. Representative pure amines include octylamine, decylamine, decenylamine, octadecylamine and octadecenylamine. Preferred amines are commercial mixtures obtained from hydrolysis of animal and vegetable oils, such as coconut oil, soybean oil, tallow or cottonseed oil, followed by ammonolysis, dehydration and hydrogenation. The resultant amines consist predominately of mixtures of saturated and unsaturated primary n-aliphatic amines containing from 12 to 18 carbon atoms, depending upon the oil that is employed as a starting material. At present it is believed that optimum conditioning of high nitrogen analysis mixed fertilizer granules and $NH_4NO_3$ prills is obtained with n-aliphatic primary amines in which the aliphatic groups consist for the most part of a mixture of $C_{16}$ and $C_{18}$ hydrocarbons, e.g., amines from soybean oil and tallow.

Examples of suitable oily solvents that are useful in making up the clay coating are hydrocarbons, such as for example, mineral oil, kerosene and pine oil. With some amines, the oily solvent for the amine can be a hydrocarbon which also contains polar groups, such as, for example, fatty nitriles which are obtained by ammonolysis and dehydration of fatty acids from vegetable and animal oils of the type described above.

As mentioned, a noncationic (i.e., nonionic or anionic) surface active agent is optionally dissolved in the oil. As examples of suitable nonionic agents may be mentioned: condensation products of fatty acids with ethylene oxides having fatty chains of 12 to 18 carbon atoms and polyethylene oxide chains of 220 to 2200 molecular weight; condensation products of primary n-aliphatic amines with ethylene oxide having fatty chains of 12 to 18 carbons and polyethylene oxide chains of 220 to 2200 molecular weight. Mahogany sulfonates are representative of oil-compatible anionic surface active agents.

The coated clay conditioning agent is useful in conditioning granular and semigranular particles of mixed fertilizer salts or single fertilizer salts. The coated clay has been found to be especially useful in preventing caking of very soluble high nitrogen analysis fertilizer salts, e.g., ammonium nitrate and 10-10-10, 12-0-12 and 14-0-14 grades of fertilizer. The conditioning agent should also be effective in preventing caking of urea granules. An additional advantage of the coating agent is that it will not sensitize ammonium nitrate, as will many organic materials, and therefore will not cause the nitrate to detonate by accident. Optimum benefits of this invention are realized in conditioning soluble high nitrogen analysis salts which have a free moisture content in excess of about 0.5%, inasmuch as it is extremely difficult to prevent caking of these materials with known anticaking agents. The term "free moisture" or "F.M." refers to the weight percentage of a material that is eliminated by heating the material to essentially constant weight at 220° F.

To condition fertilizer granules with the clay conditioning agent, the granules are dry tumbled with a suitable quantity of kaolin clay which has been previously coated with an oily amine solution for a time sufficient for a uniform layer of the precoated clay crystals to accumulate on surfaces of the granules. Tumbling may be at room temperature although it is preferable to preheat the granules to a temperature below their melting point or, in the case of ammonium nitrate, to a temperature below the transition point of the salt. A rotary dryer is satisfactory for applying the conditioning agent. A convenient point in the fertilizer manufacturing process to apply the conditioning agent is immediately after the granulating step, before cooling and screening.

The coated clay particles are used in amounts within the range of about 5 to about 40 lbs./ton of fertilizer granules, and usually in amount within the range of 10 to 30 lbs./ton. When employed in amount less than about 10 lbs./ton, the agent may lose some of its effectiveness and may not provide adequate cake resistance for most applications. On the other hand, use of more than about 30 lbs./ton of the coated clay may be prohibitive from an economic standpoint. Excellent results have been realized using coated clay of this invention in amount such as to incorporate only 0.3 pound of amine per ton of ammonium nitrate prills, e.g., 20 lbs./ton of coated clay particles containing amine in amount of 1.5% by weight. The optimum quantity of conditioning agent will vary with the nature of the fertilizer granules and the particle size of the granules, as well as with the extent of cake resistance that is required of the conditioned granules.

It is also within the scope of this invention to treat further the conditioned fertilizer particles with an additional powdered mineral agent to improve the ease of flow of the conditioned fertilizer particles, since the clay agent of this invention functions principally as an anticaking agent and does not improve to an appreciable extent the ease of flow of the fertilizer particles (as measured by the angle repose of poured granules). Thus, after initially dusting fertilizer granules with kaolin containing sorbed oily amine solution, in accordance with this invention, a material which is effective in improving the ease of flow of the precoated granules (e.g., calcined attapulgite clay) is then dusted on the granules.

The following examples are given to contribute more fully to an understanding of the present invention and to demonstrate the superiority of the novel clay conditioning agent of this invention over a variety of prior art conditioning agents.

PREPARATION OF COATED CLAY SAMPLES

In coating clay with oily solutions of fatty amine, the following procedure was used. A previously formed amine solution (with or without trace of nonionic surfactant where indicated) was heated to about 220° F. and the warm solution was slowly dripped onto kaolin clay in a screen mill, the mixture milled for about an hour to thoroughly blend the ingredients and then screened through a screen having 0.027-inch openings. The same procedure was also used in producing test coated clays containing amine without oily solvent. Following are formulations of normally liquid (i.e., at 70° F.) coating formulations employed.

CLAY COATING COMPOSITIONS

| Ingredients | Weight percent |
|---|---|
| Formulation A: | |
| Fatty Amine Mixture #1 (mixed n-aliphatic primary monoamines consisting predominantly of unsaturated $C_{18}$ amines and also containing $C_{16}$ amines) | 40 |
| Mineral oil | 59 |
| Nonionic surfactant [1] | 1 |
| Formulation B: | |
| Fatty Amine Mixture #2 (consisting of about 2% tetradecylamine, 24% hexadecylamine, 71% octadecylamine and 3% octadecadienylamine) | 30 |
| Mineral oil | 69 |
| Nonionic surfactant [1] | 1 |
| Composition C: | |
| Fatty Amine Mixture #1 | 59 |
| Mineral oil | 40 |
| Nonionic surfactant [1] | 1 |
| Composition D: | |
| Fatty Amine Mixture #3 (consisting of about 20% hexadecylamine, 17% octadecylamine, 26% octadecenylamine and 37% octadecadienylamine) | 40 |
| Mineral oil | 59 |
| Nonionic surfactant [1] | 1 |

[1] Condensation product of about 10 mols ethylene oxide with 1 mol of a mixture of fatty acids containing 50% oleic acid, 40% linoleic acid, 5% linolenic acid and 5% rosin acids.

CONDITIONING OF FERTILIZERS

All granular fertilizers were conditioned with organophilic clays or mineral dusts by agitating conditioning agent with granules in a rotary drum at ambient temperature.

DESCRIPTION OF TESTS CARRIED OUT WITH CONDITIONING AGENTS

*Percent adhesion.*—100 g. sample of prills coated with conditioner are placed on 60 mesh (Tyler series) screen and gently hand shaken for 30 seconds. The T/60 dust is collected, dried and weighed and reported as percent of the conditioner used.

*Dustiness index.*—The test method uses a standard dust chamber which provides for the recovery of dust from a sample submitted to standard "dusting" conditions. The tester is an adaptation of a device described in ASTM Standard Method No. D-547-41. The sample under test is suddenly released from a platform and permitted to fall through a rectangular chamber (8⅛" x 8⅛" cross-sectional area) for a distance of 32" into a drawer receptacle. Five seconds after the sample is dropped, a polished chromium-plated dust collector tray is inserted into the column 25" below the point of release so as to intercept and retain falling particles that may be above that point at time of insertion. Dustiness, expressed as g./ton, is determined from amount of dust collected when a 100 gram sample is allowed to fall and is calculated as follows: Weight of dust (in mg.) of 100 g. sample × 9.08.

*Hardesty bomb test.*—Sample treated with conditioning agent is placed in bomb at elevated pressure and temperature. Sample is subjected to further heating to promote maximum caking. The procedure uses a standard crushing test to evaluate extent of caking.

*Caking (lever caking tester).*—A 125 cc. sample with an adjusted F.M. of 1.0% is placed in a sealed paper bag and the bag placed under a pressure of 6 lbs./in.² for 7 days. During the 7 days, the samples in the press are heated to 90° F. for 8 hours and cooled to 75° F. for 16 hours to pass the prills through the $NH_4NO_3$ transition point.

Sample ratings are as follows:

*a*—flowable
*b*—few friable lumps
*c*—few hard lumps
*d*—mostly hard lumps
*e*—hard cake
*f*—very hard cake.

A rating of *c* in this test is considered to be indicative of an acceptable conditioner.

*Initial surface tension.*—Measured with Du Nuoy tensiometer employing the standard ring procedure described in Schwartz and Perry at page 268 of "Surface Active Agents" published by Interscience Publishers, Inc. (1949).

*Spreading characteristics* (1. *By the Du Nuoy tensiometer*):

*Method A.*—The Du Nuoy tensiometer is set at 40 dynes/cm. and 0.05 g. of the material to be tested is introduced on the liquid surface 2 cm. from the ring. If the ring releases immediately, the result is reported as: IB=(immediate break). If the ring releases in less than 60 seconds, seconds to break are reported. If the ring does not release in 60 seconds, the rating is: NB=(no break).

*Method B (paper plate method).*—A paper plate is filled with liquid and fine talc is dusted on the surface. 0.05 g. of sample is placed in the liquid at the edge of the plate. The numbers given represent the rapidity and extent of spreading as indicated by the area freed of talc by this action.

"100" indicates immediate spreading with a large area covered (in the area in which the talc was pushed back).
"10" indicates practically no spreading, etc.

*Example I*

Experiments were carried out to demonstrate that, of a wide variety of clay minerals and other finely divided minerals suggested in the prior art as conditioning agents or agents to improve the ease of flow of granular fertilizer salts, only kaolin was usitable as the solid carrier ingredient in compositions of this invention.

Samples of various minus 325 mesh minerals were coated with 5% by weight of each of coating formulations A and B, the compositions of which are described above. The method for applying coatings is also described above.

All coated minerals were applied to ammonium nitrate prills in amount of 1% (10 lbs./ton of granules) by tumbling the prills at about 70° F. with coated minerals. The F.M. of all coated prills was adjusted to 1% before testing for caking in the lever caking tester. Results are summarized in Table I.

Data in Table I show that, of the various common clays investigated, only kaolin coated with the aliphatic amine oil solutions (Samples Nos. 1 to 4) effectively conditioned the ammonium nitrate prills at the 1% moisture level. Of the various nonclay minerals, all of which have been suggested in the prior art as agents to prevent caking of various hygroscopic salts, none was satisfactory as a carrier for the amine-oil solution.

*Example II*

Experiments were carried out to compare the effectiveness of coated kaolin clays of this invention (Samples Nos. 1 to 4) as conditioning agents for ammonium nitrate prills with prior art clay conditioners including the uncoated kaolin used in producing Samples Nos. 1 to 4, activated Georgia-Florida fuller's earth (attapulgite clay), commercial onium bentonites and commercial organophilic kaolin clays.

Results in Table II show that none of the naturally occurring clays and prior art organophilic clays was an effective anticaking agent for the ammonium nitrate prills and that only coated kaolin clays of this invention effectively conditioned the prills. Thus, organophilic kaolin clays outside the scope of this invention, such as Sample No. 22 (clay coated with octylamine acetate with no oily solvent) and Sample No. 23 (kaolin coated with rosin amine stearate) were comparatively ineffectual, rating "e" and "d," respectively. The data show also the marked superiority of coated clays of this invention which rated "a" to "c" over onium clay conditioners of the prior art (Samples Nos. 25 to 27), all of which rated "d" or "f." Of the various conditioners tested, only uncoated kaolin clay (Sample No. 18) and kaolin coated with magnesium stearate (Sample No. 24) matched the excellent adhesion properties of coated clay of this invention. However, neither of these materials prevented or significantly restricted caking, as evidenced by their ratings of "f" and "e," respectively. The data show that the adhesion of onium clays (Samples Nos. 25 to 27) was extremely poor as compared with the amine-oil coated clays of this invention.

The fact that 2% of kaolin clay (Sample No. 18) was a completely ineffectual conditioner suggests that the effectiveness of the coated kaolin clay as an anticaking agent is for the most part a function of the coating. That Sample No. 22, octylamine acetate coated kaolin clay, was unsuitable indicates that results obtained with the coated clay of this invention are not obtained merely by providing a hydrophobic kaolin clay.

*Example III*

(Part A) It was shown in the previous example that exceptional results were obtained by conditioning prilled ammonium nitrate with conditioner Sample No. 2, kaolin (ASP 400) coated with 5% of amine formulation (B) containing a 30% solution in mineral oil of mixed fatty amines #2 which consists of primary n-aliphatic amines containing 16 and 18 carbon atoms. To demonstrate the desirability of using oil with fatty amine mixture #2 in coating the clay, a sample of ASP 400 was coated with 2% by weight of amine mixture #2 as the sole coating agent, no oil being present in the amine mixture. The resultant coated clay (designated as Sample No. 28) was added to the ammonium nitrate prills at the 1% level. After adjusting the F.M. of the prills to the 1% level, the prills were tested for caking in the lever tester, and the results compared with those obtained using various levels of conditioner Sample No. 2 (kaolin precoated with an oily solution of the same mixed primary n-aliphatic amines present in conditioner Sample No. 28). The procedure was repeated, comparing the effectiveness of fatty amine mixture #1 on kaolin with and without oil (conditioner Samples Nos. 1 and 29, respectively).

Results in Table III (Part A) indicate that 0.40 pound of mixed $C_{16}$ and $C_{18}$ amines (fatty amine mixture #2) per ton of prills and 0.40 lb./ton of the $C_{18}$ fatty amine mixture #1 were unsatisfactory when the amine was precoated on the kaolin without oil (conditioner Samples Nos. 28 and 29). On the other hand, 0.30 pound of fatty amine mixture #1 or 0.40 pound of fatty amine mixture #2 per ton of prills gave excellent results when an oily solvent was used with the amine coating on the clay (Samples Nos. 1 and 2). Results in Table III (Part A) show also that when oil was present with amine 0.15 pound of fatty amine mixture #2 was equivalent to 0.40 pound of fatty amine mixture #2 when no oil was present with the amines, although neither result was considered acceptable.

(Part B) To demonstrate further the necessity for using oil with amine in coating clay for use as a conditioning agent, experiments were carried out to show that the presence of the trace amounts of nonionic surfactants in the oily amine solutions used in producing conditioner Samples Nos. 1 and 2 do not impart to the amine coating agent for the clay the desired anticaking properties achieved by using oil with amine. Samples Nos. 30 and 31 composed of kaolin coated with mixed $C_{16}$ and $C_{18}$ fatty amines (fatty amine mixture #1) and small amounts of the same nonionic surfactant present in Samples Nos. 1 and 2 were prepared by first mixing fatty amine with surfactant and coating the kaolin with the mixture. The technique used in preparing Samples Nos. 30 and 31 was the same used in preparing Samples Nos. 1 and 2.

Results in Table III (Part B) show that kaolin coated with amine plus various amounts of nonionic surfactants without oil (Samples Nos. 30 and 31) was no more effective in conditioning ammonium nitrate prills than was Sample No. 29, kaolin coated with the mixed fatty amines only. These results further demonstrate that the presence of oil with amine and clay is necessary to obtain satisfactory conditioning.

*Example IV*

This example illustrates the utility of kaolin coated with oily solutions of higher n-aliphatic primary amines, in accordance with this invention, in the conditioning of three grades of granular high analysis mixed fertilizer and demonstrates the superiority of the coated clays to two commerical mineral conditioners.

Samples of ASP 400 kaolin clay were blended (by grinding) with 5% by weight of each of coating Formulations A, C and D. Each of the coated clays was applied to commercial samples of granular mixed fertilizers (10–10–10, 20–0–20 and 8–8–16) in amount of 1% (20 lbs./ton). The conditioned fertilizer granules were tested in the lever tester at 120° F. for 2 weeks to determine the effectiveness of the conditioner in maintaining the granules free flowing. To test for surface caking, each conditioned fertilizer was placed in an open pile and maintained at 72° F. and 75% R.H. for one month.

For purposes of comparison, samples of each of the fertilizer granules were coated with the following commerical mineral conditioners: a commercial calcined attapulgite clay (Attacote) and diatomaceous earth (Celite). These conditioners were used in amount of 40 lbs./ton of granules, double the level of coated kaolin conditioners, in order to compare the response of conditioned formulations of comparable cost. Results are summarized in Table IV.

Data in Table IV indicate that all of the unconditioned mixed fertilizer granules caked in the lever tester under pressure and except for the 8–8–16 grade material, surface caked in open storage. The data show that clay conditioners of this invention at only the 20 lbs./ton level prevented surface caking of all mixed fertilizers and rendered all bagged fertilizers free flowing under conditions of the lever test except for the 20–0–20 granules, which underwent a slight set during the test. In contrast, the 20–0–20 granules caked during lever testing when coated with 40 lbs./ton of the commercial mineral conditioners and also exhibited surface caking when stored in open piles. While 20 lbs./ton of the conditioning agent of this invention rendered 10–10–10 granules free flowing after being subjected to the lever test and free from caking in the open pile test, this result was not obtained with the commercial mineral conditioners at 40 lbs./ton.

*Example V*

This example illustrates the advantage of using as a conditioner kaolin coated with an oily aliphatic amine solution composition rather than applying the same quantity of oily aliphatic amine solution directly to fertilizer granules. The solution was Formulation A, containing 40 parts of mixed $C_{16}$ and $C_{18}$ fatty amines dissolved in 59 parts of mineral oil. A portion of Formulation A was coated on ASP 400 at the 5% level and the coated clay was applied to 15–10–10 fertilizer granules at 20 lbs./ton while passing the granular fertilizer through a commercial rotary cooler, thereby providing granules containing oily amine solution (Formulation A) in amount of 1 lb./ton (or 0.40 lb./ton of mixed amines #1). Another portion of the 15–10–10 granules was directly sprayed while passing through the cooler with 1 lb./ton of heated Formulation A.

About a ton of each of the conditioned granules was bagged and stored in an open pile for one month. The piles were examined after one month for set and surface caking.

Other portions of each of the conditioned 15–10–10 granules were bagged and the bagged material of each composition was stacked ten bags deep. The stacked bags were examined after 3, 6 and 9 weeks for set and caking. The fourth and ninth bags down in each stack were first examined for set and then dropped 3 feet onto a concrete floor and re-examined for caking.

The results are reported in Table V.

Data in Table V demonstrate the marked advantages realized by precoating an amine-oil conditioner, on kaolin clay. The data show that bagged fertilizer granules to which the solution had been applied directly, without being precoated on clay, caked under pressure whereas no caking occurred using the same oily amine solution precoated on kaolin. Similarly, open pile bags of the fertilizer granules coated directly with the amino-oil solution set and exhibited surface caking after only one week's storage while fertilizer granules conditioned with the solution precoated on clay exhibited only slight set and were free from surface caking after a month's storage.

*Example VI*

(1) The effectiveness of oil solutions of aliphatic amines as conditioners for ammonium nitrate prills at various levels was evaluated using the solution precoated on kaolin, in accordance with this invention and, for purposes of comparison, using the same quantity of the solution sprayed directly on the granules. The procedure was repeated with 14–0–14 granules which are known to be extremely difficult to condition. Results obtained by the bag test described in the previous example are summarized in Table VI.

Results in Table VI (Part A) for conditioning ammonium nitrate prills show that ½ lb./ton of Formulation A (solution of 40 parts mixed fatty amines #1 in 59 parts mineral oil) was more effective when precoated on kaolin than 1 lb./ton of Formulation A coated directly on the prills. These results were surprising since uncoated kaolin at even the level of 40 lbs./ton was found to be an ineffective conditioning agent for ammonium nitrate prills (see Sample No. 18, Table II).

Results in Table VI (Part B) for conditioning 14–0–14 granules show that 1½ lbs./ton of Formulation A was more effective when precoated on kaolin than 1½ lbs./ton of Formulation A coated directly on the 14-0-14 granules and that the former conditioning agent at the 1½ lbs./ton level was somewhat superior to 2 lbs./ton of Formulation A coated directly on the granules.

(2) Samples of the 14-0-14 fertilizer granules which had been treated with amine-oil solutions applied directly to the granules or with the solution precoated on kaolin clay were subjected to the following laboratory tests:

(1) Lever Caking Tester, 7 lbs./in.$^2$ at 120° F. for 2 weeks and 1 month.
(2) Hardesty Bomb Tester, 10 lbs./in.$^2$ at 105° F. for 2 weeks.
(3) Open pile test for 2 months.

Results are summarized in Table VII.

Results of the three caking tests summarized in Table VII confirm the fact that markedly superior conditioning is realized using a given quantity of amine-oil solution precoated on kaolin. The results of tests in which the fertilizer were subjected to pressure (Lever Test and Hardesty Bomb Test) show the marked superiority of 1 lb./ton of solution precoated on kaolin over 2 lbs./ton of the same solution applied directly to the granules.

*Example VII*

Tests were also carried out to demonstrate the differences in surface active effect, as evidenced by differences in spreadability on saturated ammonium nitrate solutions, between coated clay produced in accordance with this invention, prior art organic coated kaolin products and onium bentonite clays. The results are reported in Table VIII.

Spreading characteristics were evaluated by two methods described above, Test A being a qualitative method to TABLE I.—EFFECT OF MINERAL CARRIERS FOR AMINE-OIL SOLUTIONS ON CONDITIONING OF NH$_4$NO$_3$ PRILLS (1% MOISTURE CONTENT)

| Conditioner Sample No. | Conditioner Composition | | | | Percent Conditioner | Caking Test* | |
|---|---|---|---|---|---|---|---|
| | Mineral Carrier | Wt. percent | Amine-Oil Formulation | Wt. percent | | Results | Rating |
| 1 | ASP 400 [1] | 95 | A | 5 | 1 | Flowable (best sample) | a |
| 2 | ASP 400 | 95 | B | 5 | 1 | Flowable | a |
| 3 | ASP 400 | 95 | C | 5 | 1 | Few hard lumps | c |
| 4 | ASP 400 | 95 | D | 5 | 1 | Few friable lumps | b |
| 5 | Calcined fluid energy milled attapulgite clay | 95 | A | 5 | 1 | Hard cake | e |
| 6 | ....do.... | 95 | B | 5 | 1 | ....do.... | e |
| 7 | Sepiolite clay | 95 | A | 5 | 1 | ....do.... | e |
| 8 | ....do.... | 95 | B | 5 | 1 | ....do.... | e |
| 9 | Pyrophyllite | 95 | A | 5 | 1 | Hard lumps | d |
| 10 | ....do.... | 95 | B | 5 | 1 | ....do.... | d |
| 11 | Gypsum | 95 | A | 5 | 1 | Very hard cake | f |
| 12 | ....do.... | 95 | B | 5 | 1 | ....do.... | f |
| 13 | Southern (nonswelling bentonite) | 95 | A | 5 | 1 | Hard cake | e |
| 14 | ....do.... | 95 | B | 5 | 1 | ....do.... | e |
| 15 | Limestone | 95 | A | 5 | 1 | ....do.... | e |
| 16 | ....do.... | 95 | B | 5 | 1 | ....do.... | e |
| 17 | None | | | | | Very hard cake | f |

[1] A coarse size fraction of degritted Georgia kaolin clay (substantially pure kaolinite) having an average equivalent spherical diameter of 4.8 microns.
*Caking test run in lever caking tester; F.M. adjusted to 1% before testing for caking.

TABLE II.—EFFECT OF CONDITIONING AGENTS ON ADHESION AND CAKING OF NH$_4$NO$_3$ PRILLS

| Conditioner Sample No. | Conditioner Composition | Percent | Percent Adhesion (all samples at about 0.50% F.M.) | Dustiness Index, g./ton | Caking Results* | Rating |
|---|---|---|---|---|---|---|
| | Clay Compositions of Subject Invention: | | | | | |
| 1 | 95% ASP 400+5% Formulation A. | 1 | 80 | 2.7 | Flowable | a |
| 2 | 95% ASP 400+5% Formulation B. | 1 | 95 | 9.1 | Flowable (best sample) | a |
| 3 | 95% ASP 400+5% Formulation C. | 1 | 90 | 21.8 | Few hard lumps | c |
| 4 | 95% ASP 400+5% Formulation D. | 1 | 86 | 7.3 | Few friable lumps | b |
| | Uncoated Clays: | | | | | |
| 18 | ASP 400 | 2 | 94 | 45.4 | Very hard cake | f |
| 19 | Activated Attapulgite [1] | 2 | 75 | 238 | ....do.... | f |
| 20 | Activated Attapulgite [2] | 2 | 74 | 145 | ....do.... | f |
| 21 | Activated Attapulgite [3] | 2 | 42 | 494 | ....do.... | f |
| | Coated Kaolins Outside Scope of Subject Invention: | | | | | |
| 22 | 98% ASP 400+2% Octylamine Acetate | 1 | 73 | 73.5 | Hard cake | e |
| 23 | 98% ASP 400+2% Rosin Amine D Stearate.[4] | 1 | 79 | 56.3 | Many hard lumps | d |
| 24 | 99% 0.5 micron Kaolinite +1% Magnesium Stearate | 1 | 90 | 12.7 | Hard cake | e |
| | Onium Clays: | | | | | |
| 25 | Bentone 18 [5] | 1 | 44 | 114 | Very hard cake | f |
| 26 | Bentone 27 [6] | 1 | 44 | 282 | ....do.... | f |
| 27 | Bentone 34 [7] | 1 | 42 | 208 | Hard lumps | d |

[1] Average equivalent spherical diameter—about 2 microns.
[2] Average equivalent spherical diameter—about 4 microns.
[3] Average equivalent spherical diameter—about 15 microns.
[4] Stearic acid salt of primary amine prepared from resin acids.
[5] Octadecylammonium bentonite.
[6] Heptadodecylammonium bentonite.
[7] Dimethyldioctadecylammonium bentonite.

*Caking test run in lever caking tester; F.M. adjusted to 1% before testing for caking.

determine whether the amount of material was sufficient to decrease the surface tension of the liquid phase to 40 dynes/cm. or less and Test B being a quantitative test indicating the time and extent of spreading.

Qualitative data in Table VIII for spreadability of organophilic clays in saturated ammonium nitrate solution show that with all prior art organophilic clays (Samples Nos. 22 to 27) there was no break (NB) of the ring in the Du Nuoy tensiometer under the test conditions, indicating that the surface tension of the solution was not reduced to or below 40 dynes/cm. by incorporation of the organophilic clay. This was confirmed by independent surface tension evaluations (Du Nuoy). In contrast, there was immediate break (IB) in all solutions containing organophilic clay of this invention, except for Samples Nos. 3, 33 and 35, where there was a rapid break of 10 sec., 30 sec. and 2 sec., respectively. Results of the quantitative spreadability test, Test B, also show that prior art organophilic clays do not exhibit the spreadability in saturated ammonium nitrate solution of coated clays of this invention (all of which caused substantial or complete spreading of the test talc powder in less than one minute). These data, taken in light of conditioning data in Table II, indicate that the improved spreadability of conditioners of this invention is responsible, at least in part, for the superiority of these conditioners over other organophilic clays.

TABLE V.—COMPARISON OF THE EFFECTIVENESS OF OF SOLUTION OF FATTY AMINE IN OIL ON CONDITIONING 15-10-10 GRANULES WHEN PRECOATED ON KAOLIN AND WHEN APPLIED DIRECTLY TO GRANULES

| Test | Conditioner | |
|---|---|---|
| | 20 lbs./ton of kaolin coated with 5% amine-oil solution (1 lb./ton amine-oil solution) | 1 lb./ton of amine-oil solution coated directly on granules |
| BAG TEST | | |
| 3 weeks: | | |
| 4th bag | No set, no caking | No set, slight caking. |
| 9th bag | Slight set, no caking | Set, hard lumps. |
| 6 weeks: | | |
| 4th bag | ___do___ | Slight set, some lumps. |
| 9th bag | ___do___ | Set, caked. |
| 9 weeks: | | |
| 4th bag | ___do___ | Set, hard lumps. |
| 9th bag | Set, no caking | Set, caked. |
| OPEN PILE TEST | | |
| 1 day | Slight set | Slight set. |
| 1 week | Slight set, no surface caking. | Set, some surface caking. |
| 2 weeks | ___do___ | Set, surface caking. |
| 1 month | Slight set, no surface caking, friable lumps at bottom of pile. | Set, surface caking, caked under pile. |

TABLE III.—PART (A) EFFECT OF PRESENCE OF OIL WITH FATTY AMINE ON COATED KAOLIN CONDITIONER

| Conditioner Sample No. | Conditioner Composition | Percent Conditioner | Fatty Amine, Lbs./Ton of NH₄NO₃ Prills | Caking Results [2] | Rating |
|---|---|---|---|---|---|
| 2 | 95% ASP 400+5% Formulation B (containing 1½% Fatty Amine Mixture #2). | 1 | 0.30 | Free flowing | a |
| 2 | ___do___ | ¾ | 0.23 | Some friable lumps | b |
| 2 | ___do___ | ½ | 0.15 | Hard lumps | d |
| 28 | 98% ASP 400+2% Fatty Amine Mixture #2 | 1 | 0.40 | ___do___ | d |
| 1 | 95% ASP 400+5% Formulation A (containing 2% Fatty Amine Mixture #1). | 1 | 0.40 | Free flowing | a |
| 29 | 98% ASP 400+2% Fatty Amine Mixture #1 | 1 | 0.40 | Hard cake | e |

PART (B) EFFECT OF PRESENCE OF TRACE OF NONIONIC SURFACE ACTIVE AGENT WITH FATTY AMINE ON COATED KAOLIN CONDITIONER

| | | | | | |
|---|---|---|---|---|---|
| 30 | 97.99% ASP 400+2% Fatty Amine Mixture #1+ 0.01% Surfactant [1]. | 1 | 0.40 | Hard cake | e |
| 31 | 97.95% ASP 400+2% Fatty Amine Mixture #1+ 0.05% Surfactant [1]. | 1 | 0.40 | ___do___ | e |

[1] Condensation product of about 10 mols ethylene oxide with 1 mol of mixed fatty acids.
[2] Run in lever caking tester; F. M. of coated prills adjusted to 1%.

TABLE IV.—CONDITIONING OF GRANULAR MIXED FERTILIZERS

| Fertilizer Grade | Test | Conditioner, lbs./Ton Fertilizer | | | | | |
|---|---|---|---|---|---|---|---|
| | | 20 lbs./ton of ASP 400 coated with 5% Formulation A | 20 lbs./ton of ASP 400 coated with 5% Formulation C | 20 lbs./ton of ASP 400 coated with 5% Formulation D | 40 lbs./ton Attacote | 40 lbs./ton Celite | No Conditioner |
| 10-10-10 | Lever test | Flowable | Flowable | Flowable | Caked | Caked | Caked. |
| 10-10-10 | Surface caking | None | None | None | None | None | Surface cake. |
| 20-0-20 | Lever test | Flowable | Flowable | Slight set | Caked | Caked | Caked. |
| 20-0-20 | Surface caking | None | None | None | Surface cake | Surface cake | Surface cake. |
| 8-8-16 | Lever test | Flowable | Flowable | Flowable | No cake | No cake | Caked. |
| 8-8-16 | Surface caking | None | None | None | None | None | None. |

TABLE VI.—COMPARISON OF THE EFFECTIVENESS OF SOLUTION OF FATTY AMINE IN OIL IN CONDITIONING WHEN PRECOATED ON KAOLIN AND WHEN APPLIED DIRECTLY TO PRILLS

[(A) Conditioning $NH_4NO_3$ prills]

| Bag Test | Conditioner | | | |
|---|---|---|---|---|
| | 10 lbs./ton of kaolin coated with 5% Formulation A (½ lb./ton Formulation A) | 20 lbs./ton of kaolin coated with 5% Formulation A (1 lb./ton Formulation A) | ½ lb./ton Formulation A coated directly on prills | 1 lb./ton Formulation A coated directly on prills |
| 3 weeks: | | | | |
| 4th bag | No set, no caking | No set, no caking | No set, no caking | No set, no caking. |
| 9th bag | Slight set, no caking | ----do---- | Slight set, lumps | Slight set, no caking. |
| 6 weeks: | | | | |
| 4th bag | ----do---- | ----do---- | Set, lumps | Set, lumps. |
| 9th bag | Set, no caking | ----do---- | Set, caked | Do. |
| 9 weeks: | | | | |
| 4th bag | Set friable lumps | ----do---- | ----do---- | Do. |
| 9th bag | ----do---- | ----do---- | ----do---- | Do. |

[(B) Conditioning 14-0-14 granules]

| Bag Test | Conditioner | | | | | |
|---|---|---|---|---|---|---|
| | 20 lbs./ton of kaolin coated with 5% Formulation A (1 lb./ton Formulation A) | 30 lbs/ton of kaolin coated with 5% Formulation A (1.5 lbs./ton Formulation A) | 40 lbs./ton of kaolin coated with 5% Formulation A (2.0 lbs./ton Formulation A) | 1 lb./ton Formulation A coated directly on granules | 1.5 lbs./ton Formulation A coated directly on granules | 2.0 lbs./ton Formulation A coated directly on granules |
| 3 weeks: | | | | | | |
| 4th bag | Caked | Free flowing | Free flowing | Caked | Set, no caking | Free flowing. |
| 9th bag | ----do---- | ----do---- | ----do---- | ----do---- | ----do---- | Do. |
| 6 weeks: | | | | | | |
| 4th bag | Test discontinued | Free flowing | Free flowing | Test discontinued | Set, no caking | Set, no caking. |
| 9th bag | | ----do---- | ----do---- | | Set, friable lumps | Do. |
| 9 weeks: | | | | | | |
| 4th bag | Test discontinued | Slight set | Slight set | Test discontinued | Set, hard lumps | Set, friable lumps. |
| 9th bag | | ----do---- | ----do---- | | ----do---- | Do. |

TABLE VII.—COMPARISON OF CONDITIONING OF 14-0-14 GRANULES

| | Conditioner | | | | | |
|---|---|---|---|---|---|---|
| | 20 lbs./ton of kaolin coated with 5% Formulation A (1 lb./ton Formulation A) | 30 lbs./ton of kaolin coated with 5% Formulation A (1.5 lbs./ton Formulation A) | 40 lbs./ton of kaolin coated with 5% Formulation A (2.0 lbs./ton Formulation A) | 1 lb./ton Formulation A coated directly on granules | 1.5 lbs./ton Formulation A coated directly on granules | 2.0 lbs./ton Formulation A coated directly on granules |
| Lever Caking Tester: | | | | | | |
| 2 weeks | No cake | No cake | No cake | Caked | Caked | Friable cake. |
| 1 month | ----do---- | ----do---- | ----do---- | ----do---- | ----do---- | Caked. |
| Open Pile Test (surface caking and set): | | | | | | |
| 2 weeks | None | None | None | Slight set | Slight set | None. |
| 1 month | ----do---- | ----do---- | ----do---- | ----do---- | ----do---- | Slight set. |
| 2 months | Slight set | ----do---- | ----do---- | Set | Set | Do. |
| Hardesty Bomb Test (2 weeks, crushing strength) | 50 lbs./in.² | 0* | 0* | 150 lbs./in.² | 125 lbs./in.² | 125 lbs./in.² |

*Samples too friable to subject to compression test.

TABLE VIII.—COMPARISON OF SPREADABILITY OF ORGANOPHILIC CLAY MINERAL

| Conditioner Sample No. | Organophilic Clay Composition | Spreading Characteristics of Organophilic Clay in Saturated $NH_4NO_3$ Solution | | |
|---|---|---|---|---|
| | | Test A | Test B | |
| | | | Time | Distance Percent |
| | Compositions of Present Invention: | | | |
| 1 | 95% ASP 400+5% Formulation A (2.0% Amine content). | IB | 5-10 sec | 100 |
| 2 | 95% ASP 400+5% Formulation B (1.5% Amine content). | IB | 25 sec | 100 |
| 3 | 95% ASP 400+5% Formulation C (2.95% Amine content). | 10 sec | 2 sec | 100 |
| 4 | 95% ASP 400+5% Formulation D (2.0% Amine content). | IB | 21 sec | 75 |
| 32 | 95.05% ASP 400+2.95% Mineral Oil +2.0% Amine of Formulation A. | IB | 10 sec | 100 |
| 33 | 95.05% ASP 400+3.45% Mineral Oil +1.5% Amine of Formulation B. | 30 sec | 25 sec | 70 |
| 34 | 95.05% ASP 400+2.00% Fatty Nitrile Oil +2.95% Amine of Formulation C. | IB | 2 sec | 100 |
| 35 | 95.05% ASP 400+2.95% Mineral Oil +2.0% Amine of Formulation D. | 2 sec | 25 sec | 100 |
| | Prior Art Organophilic Clays: | | | |
| 24 | Kaolin +1% Mg Stearate | NB | 1 min | 0 |
| 23 | ASP 400+2% Rosin Amine D Stearate | NB | 1 min | 5 |
| 22 | ASP 400+2% Octylamine Acetate | NB | 1 min | 80 |
| 25 | Bentone 18C | NB | 1 min | 50 |
| 26 | Bentone 27 | NB | 1 min | 50 |
| 27 | Bentone 34 | NB | 1 min | 10 |

We claim:
1. Kaolin clay particles coated with from about 1% to 10% by weight of an n-aliphatic primary amine containing 8 to 22 carbon atoms and an inert oily solvent for said amine, said oily solvent being selected from the group consisting of a hydrocarbon oil and a fatty acid nitrile containing from 12 to 18 carbon atoms.

2. The product of claim 1 in which said kaolin clay particles are coated with from about 2% to 8% by weight of said amine and said oily solvent, and said amine contains from 16 to 18 carbon atoms.

3. The product of claim 1 in which said amine is present in amount of 15 to 85 parts by weight to 85 to 15 parts by weight of said oily solvent.

4. The product of claim 1 in which said kaolin clay particles are coated with from about 3% to 6% by weight of said oily solvent and said amine, and said amine is a mixture of primary n-aliphatic amines having 16 to 18 carbon atoms and is present in amount of 30% to 60% of the combined weight of said oily solvent and said amine.

5. The product of claim 4 which contains from 0% to 3%, based on the weight of said mixture of amines, of a polyethoxyester of a fatty acid having 12 to 18 carbon atoms and having polyethylene oxide chains of 220 to 2200 molecular weight.

6. The product of claim 4 in which said oily solvent is mineral oil.

7. In the conditioning of granular ammonium nitrate particles against caking with an n-aliphatic primary amine having from 8 to 22 carbon atoms, the improvement which consists in coating the surfaces of said granular particles with kaolin clay particles coated with from about 1% to 10% by weight of an n-aliphatic primary amine containing 8 to 22 carbon atoms and an inert oily solvent for said amine, said oily solvent being selected from the group consisting of a hydrocarbon oil and a fatty acid nitrile containing from 12 to 18 carbon atoms.

8. In the conditioning of hygroscopic salt particles against caking with a primary n-aliphatic amine having from 8 to 22 carbon atoms, said particles comprising a water-soluble inorganic salt of nitrogen, the improvement which consists in
coating the surface of said hygroscopic salt particles with a small amount of dry, minus 325 mesh particles of kaolin clay the surface of which contains a small amount of a normally liquid solution of said amine in an oily solvent selected from the group consisting of a hydrocarbon oil and a fatty acid nitrile containing from 12 to 18 carbon atoms.

References Cited by the Examiner
UNITED STATES PATENTS

| | | | |
|---|---|---|---|
| 2,320,009 | 5/1943 | Ralston et al. | 106—72 |
| 2,531,396 | 11/1950 | Carter et al. | 106—72 |
| 2,535,647 | 12/1950 | Millman et al. | 106—72 |
| 2,690,389 | 9/1954 | Studebaker | 71—64 |
| 2,702,747 | 2/1955 | Studebaker | 71—64 |
| 2,761,835 | 9/1956 | Brown | 160—72 |
| 2,797,196 | 6/1957 | Dunn et al. | 252—8.5 |
| 2,815,292 | 12/1957 | Thiele | 106—72 |
| 2,948,632 | 8/1960 | Albert et al. | 160—72 |
| 2,982,665 | 5/1961 | Wilcox | 106—308 |
| 3,041,159 | 6/1962 | Smith | 71—64 |
| 3,034,858 | 5/1962 | Vives | 71—64 |

DONALL H. SYLVESTER, *Primary Examiner.*

ANTHONY SCIAMANNA, *Examiner.*